(12) United States Patent
Liebig et al.

(10) Patent No.: US 7,188,563 B2
(45) Date of Patent: Mar. 13, 2007

(54) PISTON ARRANGEMENT OF A HYDRAULIC ACTUATING DEVICE ON MOTOR VEHICLES

(75) Inventors: Dirk Liebig, Ebern (DE); Stefan Gebert, Sonnefeld (DE); Christian Sperber, Ebern (DE); Harry Steinmetz, Ebern (DE)

(73) Assignee: FTE automotive GmbH, Ebern (DE)

( * ) Notice: Subject to any disclaimer, the term of this patent is extended or adjusted under 35 U.S.C. 154(b) by 0 days.

(21) Appl. No.: 11/261,353

(22) Filed: Oct. 28, 2005

(65) Prior Publication Data
US 2006/0096452 A1    May 11, 2006

(30) Foreign Application Priority Data
Nov. 5, 2004    (DE)    ................ 10 2004 053 913

(51) Int. Cl.
*F16J 1/14* (2006.01)
*B60K 23/00* (2006.01)
*B60T 7/00* (2006.01)

(52) U.S. Cl. ................ 92/187; 92/128; 403/141

(58) Field of Classification Search ................ 92/128, 92/129, 187, 188; 403/76, 141
See application file for complete search history.

(56) References Cited

U.S. PATENT DOCUMENTS 3,107,111 A    10/1963    Hager et el.
5,143,469 A *  9/1992    Cadeddu ................ 403/133
5,290,120 A *  3/1994    Osterfeld et al. ........ 403/133
5,335,585 A *  8/1994    Fischenich et al. ...... 92/128
5,499,570 A *  3/1996    Bergelin et al. ......... 92/84
6,446,436 B1   9/2002    Winkelmann et al.
6,813,991 B2 * 11/2004    Koth ...................... 92/187
7,047,868 B2 *  5/2006    Nolan et al. ............. 92/187

FOREIGN PATENT DOCUMENTS

DE    198 24 530 A1    12/1998
DE    100 62 988 A1    7/2002
GB        2235961 A *    3/1991

* cited by examiner

*Primary Examiner*—Thomas E. Lazo
(74) *Attorney, Agent, or Firm*—Reising, Ethington, Barnes, Kisselle, P.C.

(57) ABSTRACT

A piston arrangement for master and/or slave cylinders of a hydraulic actuating device for clutch and/or brake systems on motor vehicles is disclosed. An insert is inserted into a recess of the piston up to a first stop, the insert having a ball seat and an expandable insertion sleeve which is undercut with respect to the ball seat and protrudes with its expandable region. A ram is pushed into the sleeve with its ball end until it snaps into the ball seat. As the ram is further pressed axially, the insert slides over the first stop, is firmly pressed into a narrow hole section of the recess and strikes a second stop at the inner end of the recess. The insertion sleeve is then tightly enclosed by the piston wall and can no longer expand even in the event of very high pull-out forces, i.e. cannot release the ball end of the ram.

10 Claims, 6 Drawing Sheets

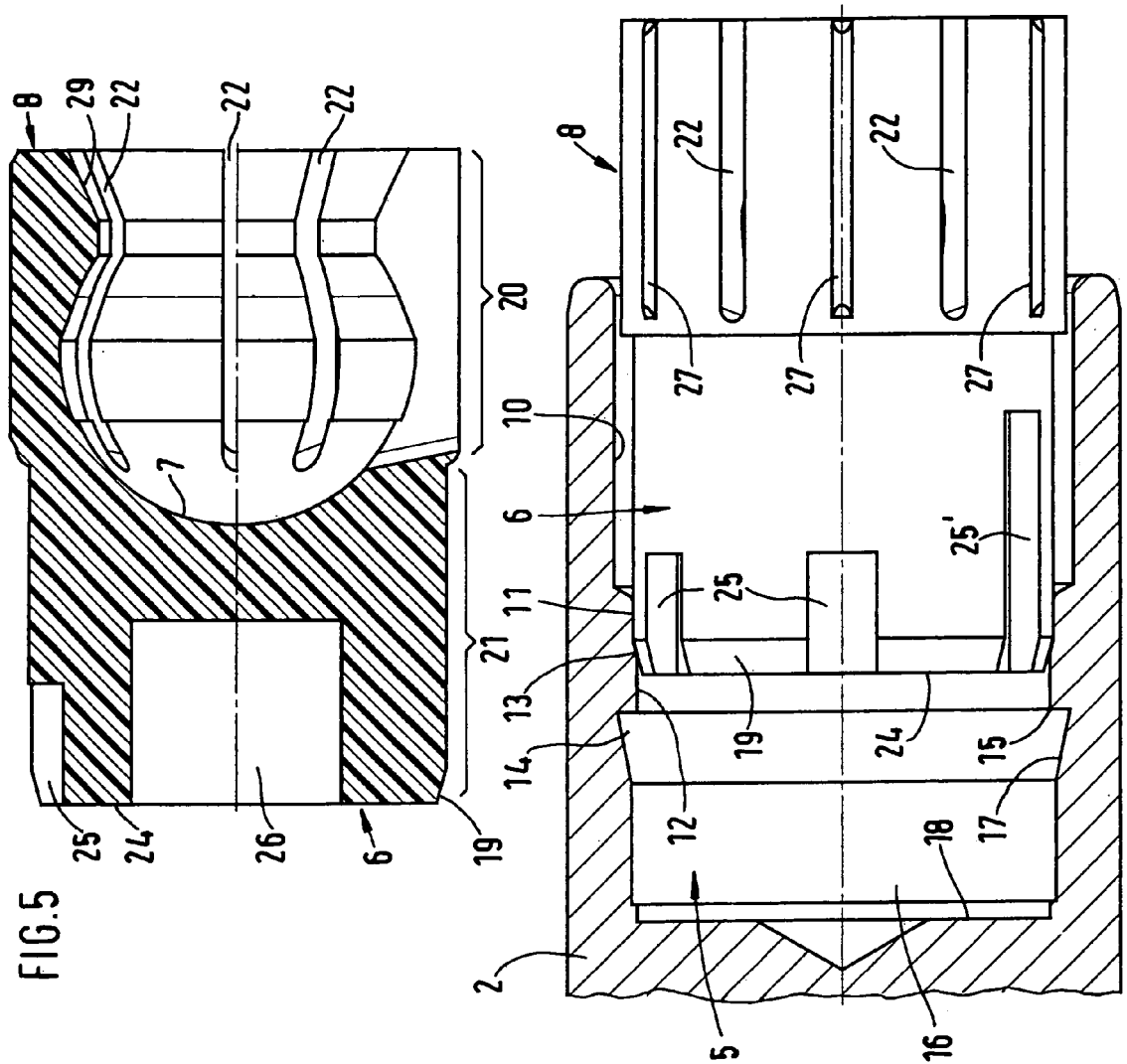
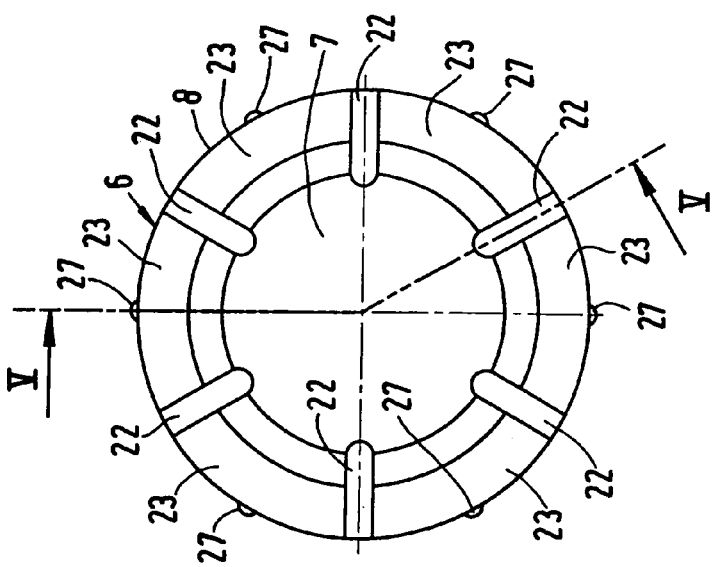

PISTON ARRANGEMENT OF A HYDRAULIC ACTUATING DEVICE ON MOTOR VEHICLES

BACKGROUND OF THE INVENTION

The invention relates to a piston arrangement for master and/or slave cylinders of a hydraulic actuating device for clutch and/or brake systems on motor vehicles.

In a known piston arrangement of this type (DE 100 62 988 A1), assembly is carried out in two separate steps. Firstly, the snap connection is brought about between the ram and the insert, referred to in said document as the piston link head. The unit preassembled in this way is then inserted into the recess and screwed into the latter by means of a threaded engagement. For this purpose, the recess is provided with an internal thread and the insert is provided with a corresponding external thread. On account of the threaded engagement, this known piston arrangement is expensive to manufacture, and special measures moreover have to be taken in order to prevent loosening of the screw connection. In terms of the requirements in mass production, assembly in two steps is complicated, wherein the handling of the preassembled unit consisting of the ram and the insert is made more difficult on account of the ball-and-socket connection of these parts.

OBJECT OF THE INVENTION

It is an object of the invention to simplify the manufacture and assembly of such piston arrangement and to fix the insert in the recess of the piston so that it is secured against high pull-out forces introduced via the ram, even without threaded engagement.

SUMMARY OF THE INVENTION

According to the invention, there is provided a piston arrangement for one of a master and slave cylinder of a hydraulic actuating device for one of a clutch and brake system on a motor vehicle, comprising
a piston having an outer end with a recess,
an insert suitable for fixing in the recess, said insert having a ball seat and an insertion sleeve which is undercut with respect to the ball seat, said insertion sleeve having slits and thus being expandable and, when it is fully inserted in the recess, being tightly enclosed by a piston wall which delimits the recess, and
a ram which transmits actuating travels and forces, said ram having a ball end which is shaped so as to be complementary to the ball seat, which ball end can be coupled to the insert in order to mount the ram in an articulated manner via a snap connection brought about by the expandable insertion sleeve;
wherein the insert is provided with a peripheral chamfer or the like at its inner end, said peripheral chamfer being assigned, within the recess of the piston, a first stop for delimiting a first insertion travel of the insert in the recess, wherein, for bringing about the snap connection, the insert bearing against the first stop protrudes outwards with its expandable insertion sleeve substantially out of the recess of the piston,
an axial pressure force that is to be exerted on the ram in order to bring about the snap connection being smaller than an axial pressure force that is to be exerted on the ram in order for the insert to slide over the first stop in the recess, and a second insertion travel of the insert which starts with the sliding-over being delimited by a second stop at the inner end of the recess.

In the piston arrangement designed according to the invention, firstly the insert is introduced into the recess of the piston until the peripheral chamfer of the insert strikes the first travel-delimiting stop. At the end of this first insertion travel, the insertion sleeve of the insert, which can be expanded to produce the snap connection, protrudes out of the recess of the piston.

The ram which is then pushed with its end ball first into the insertion sleeve in the axial direction of the piston drives the end ball with the axial force required to overcome the spring forces of the insertion sleeve until it meets the ball seat in the insert, as a result of which the snap connection is brought about. During this, the insert remains against its first stop in the recess of the piston because the axial pressure force required to produce the snap connection is smaller than the axial pressure force which has to be exerted on the ram in order to slide over the first stop, that is to say is smaller than the retaining force at the first stop.

When the axial pressure force on the ram is increased, the insert slides over the first stop in the recess of the piston, with partial elastic and also plastic deformation of the regions of the insert which bear against the first stop. The second insertion travel of the insert, which starts at this point, is delimited by the second stop at the inner end of the recess. Once the insert bears against the second stop, the expandable insertion sleeve of the insert is located within the recess and is tightly enclosed by the piston wall delimiting the recess. In this position, the end ball of the ram is located without play in the ball seat and cannot be pulled out of the insert and the insert cannot be pulled out of the piston, even if very high pull-out forces are applied.

The design of the piston arrangement according to the invention permits very simple assembly, in which the ram is driven with its end ball in a single axial movement into the insert inserted in the piston, wherein firstly the snap connection is brought about and immediately thereafter the insert is pushed into its final position in the recess. This does not lead to any deformation of the ball-and-socket joint which would give rise to play, since the transmission of pressure forces to the insert takes place via the form-fitting full bearing between end ball and ball seat.

Continuing the concept of the invention, the recess is designed as an elongate blind hole with a certain profiling which also produces the first and second stop for the insert. Accordingly, the insert is designed with an inner cylindrical section and an outer cylindrical section of larger diameter, in a manner adapted to the profiling of the elongate blind hole, in order to ensure the abovementioned simple assembly and the ability to withstand even very high pull-out forces.

Preferably, grooves are provided on the circumferential surface of the inner section of the insert in a uniformly distributed manner, which grooves reduce the bearing surface contact with that cylindrical hole section of the elongate blind hole which is slid over when the retaining force of the first stop is overcome by partial elastic/plastic deformation of the relevant region, as a result of which the necessary axial press-in force is reduced at the same time. Some of these grooves may have a greater axial length than the others, in order to evacuate air from the inner closed region of the elongate blind hole in the piston as the insert is pushed in.

The deformability of the inner section of the insert during the press-in operation may advantageously be increased by virtue of a concentric cut-out in the end face of its inner section, and thus the axial force required to press it in can be reduced. By virtue of ribs on the outer circumference of the insertion sleeve of the insert, the bearing surface portion of the insertion sleeve as it is pressed into the outer, first hole section of the elongate blind hole can also advantageously be reduced, and this also reduces the necessary axial press-in force.

A design of the ball end of the ram according to which the ball end is shaped so as to be free of any ridges in its surface regions which transmit pressure forces and tensile forces, allows the completely ridge-free moulding of an ideal ball joint, so that a play-free fit in the ball seat of the insert is made possible.

Advantageously, the materials for the three components of the piston arrangement are selected from aluminum, aluminum alloy and plastic. By using aluminum or an aluminum alloy for the piston, the latter can be designed to be relatively very thin-walled in the region of the insertion sleeve of the insert, without any strength considerations and without any fear of deformations of the piston wall when the insert is pressed in or in the event of axial tensile stresses via the ram. As a result, the insert, preferably molded from plastic as the ram, can also be given a larger diameter in this region, and this in turn permits an advantageously large ball seat and ball diameter.

BRIEF DESCRIPTION OF THE DRAWINGS

For a better understanding of the invention and to show how the same may be carried into effect, reference will now be made, by way of example, to the accompanying drawings, in which:

FIG. 4 shows the front view of the insert, seen in the direction of arrow IV in FIG. 3, FIG. 5 shows the sectional view of the insert along the section line V—V in FIG. 4, FIG. 6 shows a broken-open longitudinal section through the outer piston end corresponding to FIG. 2, but with the insert pushed into the recess up to the first stop.

DESCRIPTION OF THE PREFERRED EMBODIMENT

Figure 1:
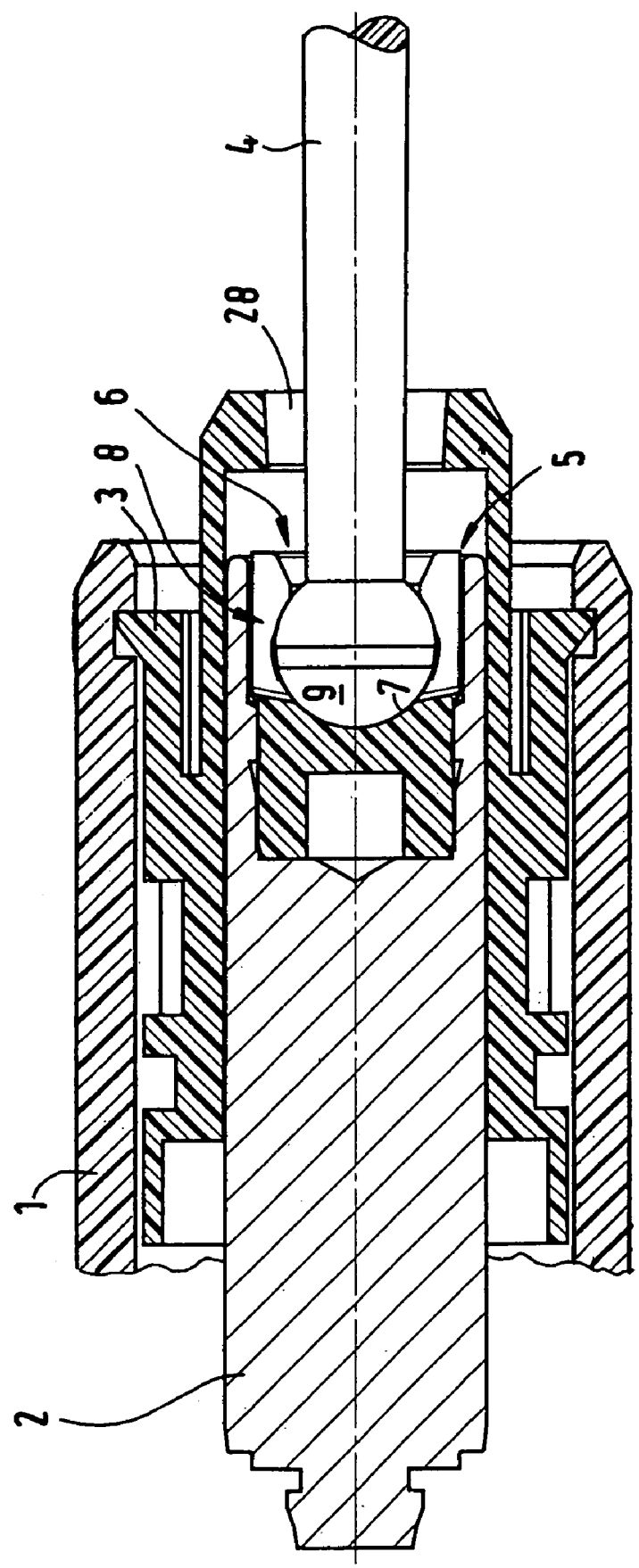
FIG. 1 shows the longitudinal section through the assembled piston arrangement, with a guide sleeve which encloses the piston, in which guide sleeve the piston is displaceably guided and which guide sleeve is pushed into a housing of a master or slave cylinder and is fixed therein, said housing being shown broken open.

The piston arrangement, the parts of the master or slave cylinder connected thereto and its individual parts are shown in the drawings on an enlarged scale compared to the actual dimensions for illustrative purposes, wherein FIGS. 2 to 9 are in turn shown on an enlarged scale compared to FIG. 1.

Of the master or slave cylinder, only the part of the housing 1 which accommodates the piston arrangement is shown broken open in FIG. 1, since the invention does not extend to the design of the master or slave cylinder. The same applies in respect of the arrangement of seals between the housing 1 and the guide sleeve 3 which encloses the piston 2 and the seal arrangements to be fitted at the inner end of the piston 2, none of said seals or seal arrangements being shown in FIG. 1. The piston 2 is a so-called plunger piston which has a cylindrical outer circumferential surface which is guided displaceably in a sealed manner in the guide sleeve 3 and can be moved in the pushing and pulling direction by means of the ram 4.

Figure 9:
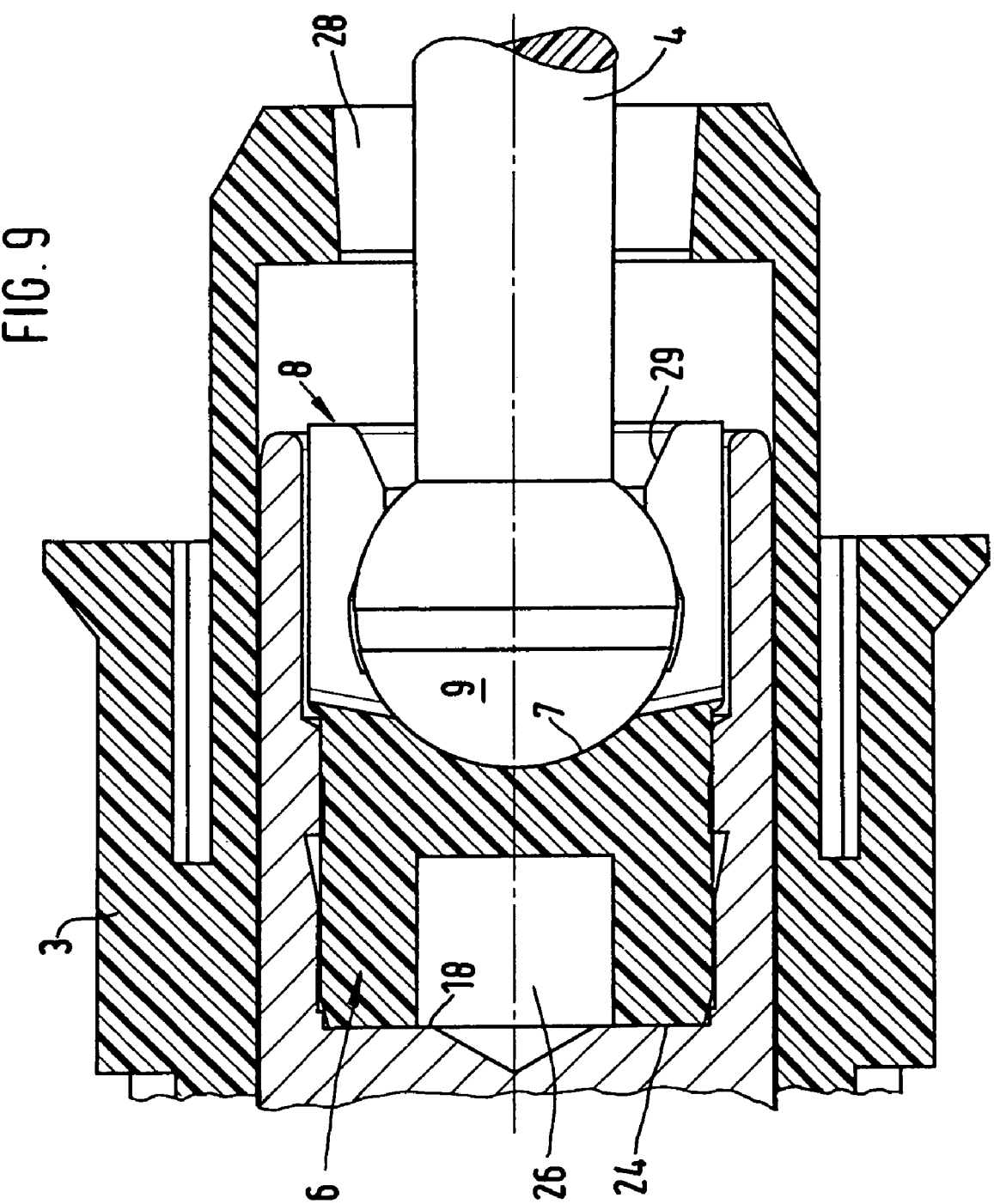
FIG. 9 shows a longitudinal section corresponding to FIGS. 7 and 8, but after complete assembly of the piston arrangement with the insert pressed into the recess until it reaches the second stop.

The piston 2 has a recess 5 in its outer end, said recess being designed as an elongate blind hole which is concentric with the central axis of the piston 2 and has a number of cylindrical hole sections of different diameter, as can best be seen from FIG. 2 and will be described in more detail below. An insert 6 suitable for fixing in the recess 5 has a ball seat 7 and an insertion sleeve 8 which is undercut with respect to the ball seat 7. The insertion sleeve 8 has slits and is thus expandable, in a manner to be described in more detail below. When it is fully inserted in the recess 5, the insertion sleeve 8 is tightly enclosed by the piston wall which delimits the recess 5, as can be seen in FIGS. 1 and 9.

Figure 8:
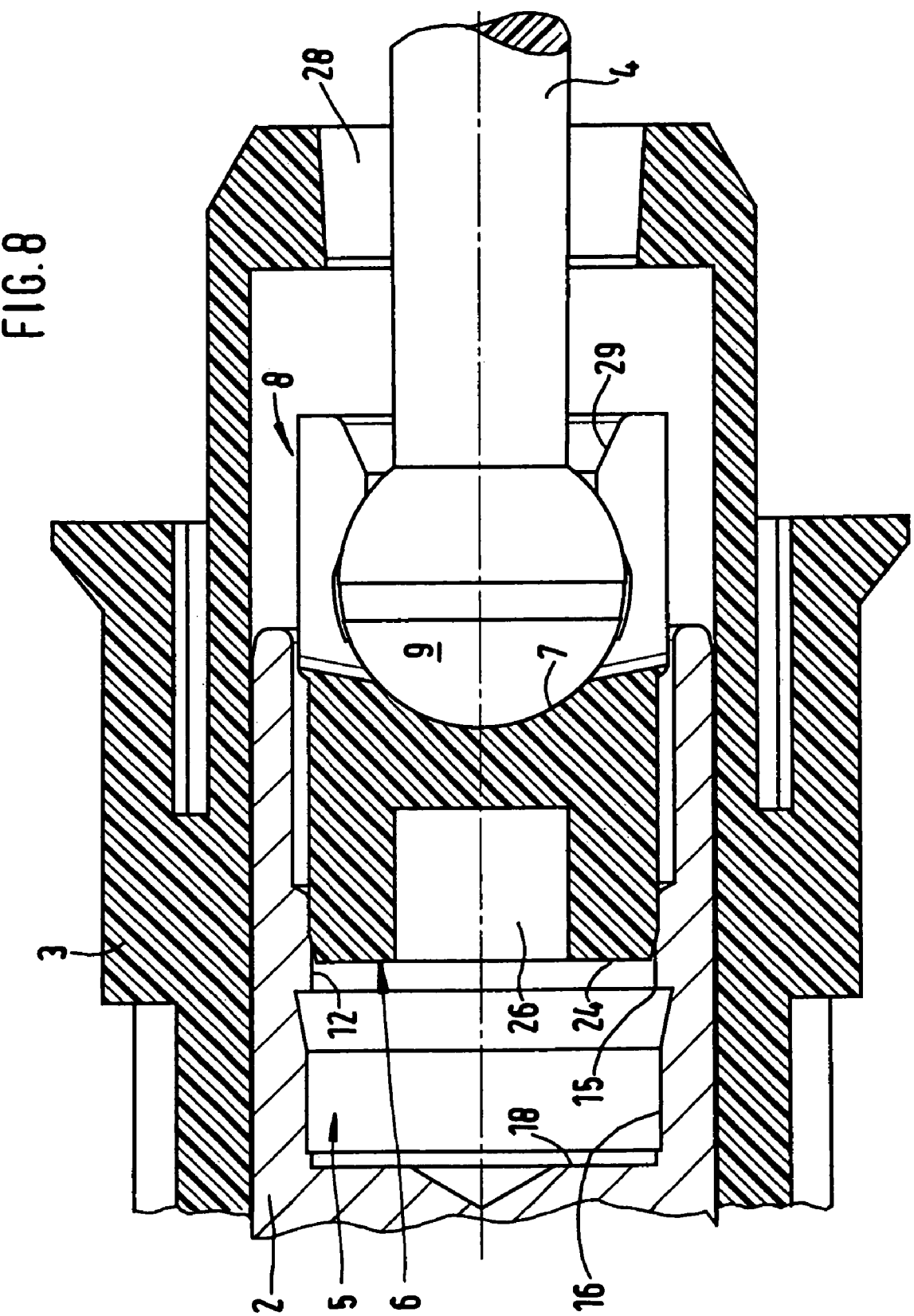
FIG. 8 shows a longitudinal section corresponding to FIG. 7, but after the snap connection of the ball end with the insertion sleeve of the insert has been brought about.

The ram 4 which transmits the actuating travels and forces is provided with a ball end 9 which is shaped so as to be complementary to the ball seat 7 in the insert 6, which ball end 9 can be coupled to the insert 6 in order to mount the ram 4 in an articulated manner via a snap connection brought about by the expandable insertion sleeve 8. The achieved coupling is shown in FIGS. 1, 8 and 9.

Figure 2:
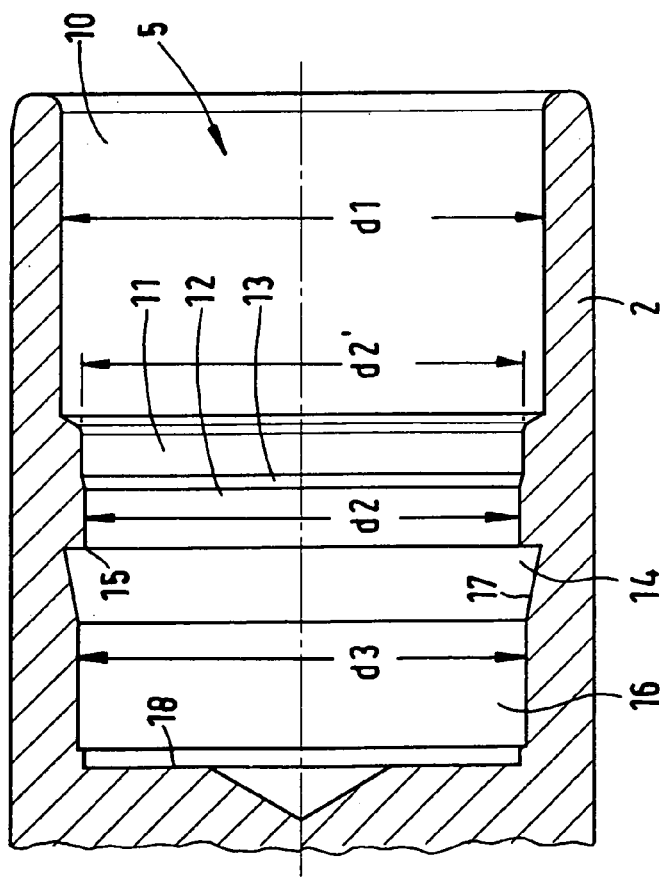
FIG. 2 shows a broken-open longitudinal section through the outer end of the piston and the recess provided therein.

As can be seen from FIG. 2, the recess 5 designed as an elongate blind hole has essentially four hole sections, of which the outer, first hole section 10 has the largest diameter d1 which is adapted to the external diameter of the insertion sleeve 8 of the insert 6. The first hole section 10 is followed by a comparatively smaller diameter d2' of the second hole section 11. This is followed by the third hole section 12 which has an only slightly smaller diameter d2 with a transitional chamfer 13 which forms a first stop for the insert 6. The third hole section 12 ends with a sharp edge 15 produced by an annular groove 14, so that, seen from the outside in, an undercut is formed behind the third hole section 12. The annular groove 14 is followed by the fourth hole section 16 which adjoins the annular groove 14 with a conical transition face 17 and which has a diameter d3 that is larger than the diameters d2' and d2 of the second and third hole sections 11 and 12, respectively. The recess 5 ends, after the fourth hole section 16, at a face 18 perpendicular to the central axis of the piston 2, which face 18 forms a second stop for the insert 6.

Figure 3:
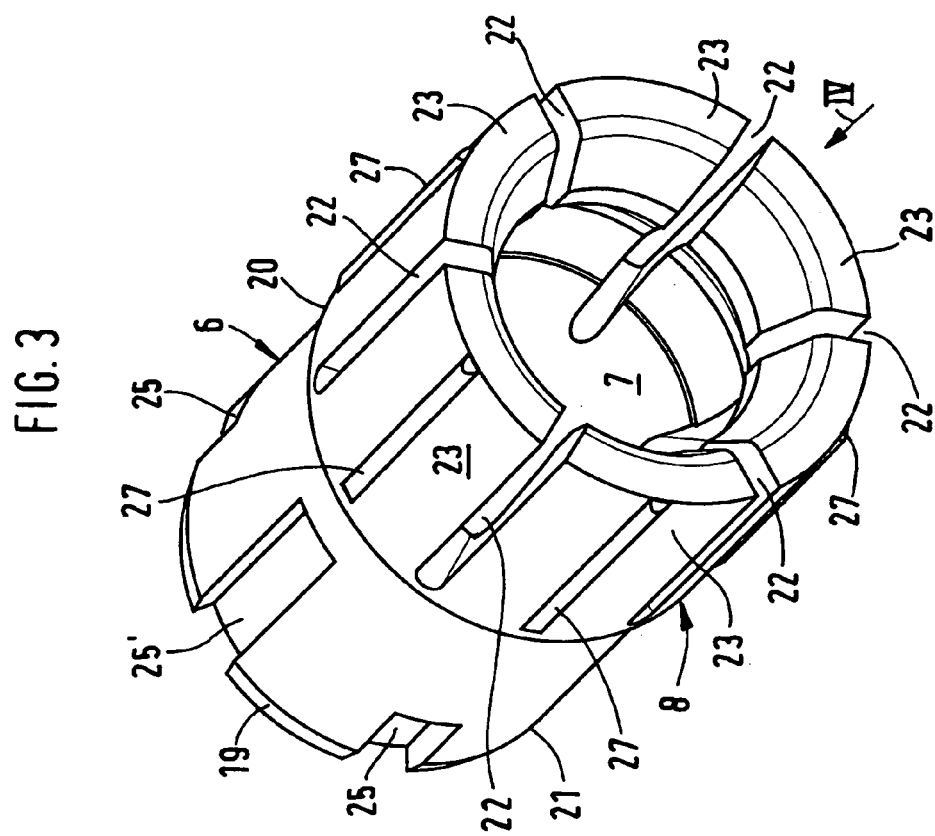
FIG. 3 shows a perspective view of the insert.

In order to describe the insert 6, reference will now be made to FIGS. 3 to 5. The insert 6 is provided at its inner end with a peripheral chamfer 19 which may also be designed as an edge rounding. This peripheral chamfer 19 strikes the transitional chamfer 13 which forms the first travel-delimiting stop when the insert 6 is introduced into the recess 5. The insert 6 has two essentially cylindrical sections 20 and 21, of which the outer section 20 has the larger diameter and forms the insertion sleeve 8. The latter is expandable by virtue of a number of axis-parallel slits 22, in the illustrated example by virtue of six slits 22, in its wall which are distributed uniformly over the circumference, said slits forming resilient tongues 23, in the example of embodiment six tongues 23. The inner section 21 of the insert 6 has the smaller diameter which forms a press fit with the diameter d2 of the third hole section 12 of the recess 5 of the piston 2.

The inner section 21 of the insert 6 has in its circumferential surface a number of axis-parallel grooves 25 which continue up to its end face 24, some of which grooves 25' have a greater axial length and serve to evacuate air from the recess 5 as the insert 6 is pressed into the latter. For the rest, however, the grooves 25, 25' reduce the bearing surface portion of the inner section 21 relative to the third hole section 12 and therefore reduce the necessary press-in forces. Comparable effects are achieved on the one hand in that the insert 6 has a concentric cut-out 26 in the end face 24 of its inner section 21, which facilitates deformations of the inner end of the inner section 21 during the press-in operation, and on the other hand in that the insertion sleeve 8 of the insert 6 has a number of axis-parallel small ribs 27 distributed over its outer circumference, which ribs reduce the bearing surface of the outer section 20 of the insert 6 relative to the wall surface of the first hole section 10.

The ball end 9 of the ram 4 is molded so as to be free of any ridges in its surface regions which transmit pressure forces and tensile forces, as a result of which the ball-and-socket joint formed of the ball seat 7 and the ball end 9 can be manufactured with narrow tolerances and practically without any play, since no deformable and thus play-forming ridge is present in the area of contact of the convex and concave ball surfaces.

Suitable material pairings are obtained when the piston 2 is made of aluminum or an aluminum alloy, whereas the insert 6 and the ram 4 with its ball end 9 are molded from thermoplastic plastics. By way of example, glass-fiber-reinforced polyamides are suitable for this purpose.

The order of the operating steps for assembling the described piston arrangement is shown in FIGS. 6 to 9. Firstly, the insert 6 is pushed with its inner section 21 into the second hole section 11 and at the same time with its outer section 20 into the first hole section 10, until the peripheral chamfer 19 strikes the transitional chamfer 13 which forms the first travel-delimiting stop. In this position of the parts, the insert 6 protrudes with its expandable insertion sleeve 8 substantially out of the recess 5 of the piston 2, as shown in FIG. 6. The piston 2 and the insert 6 are thus ready to produce the snap connection.

Figure 7:
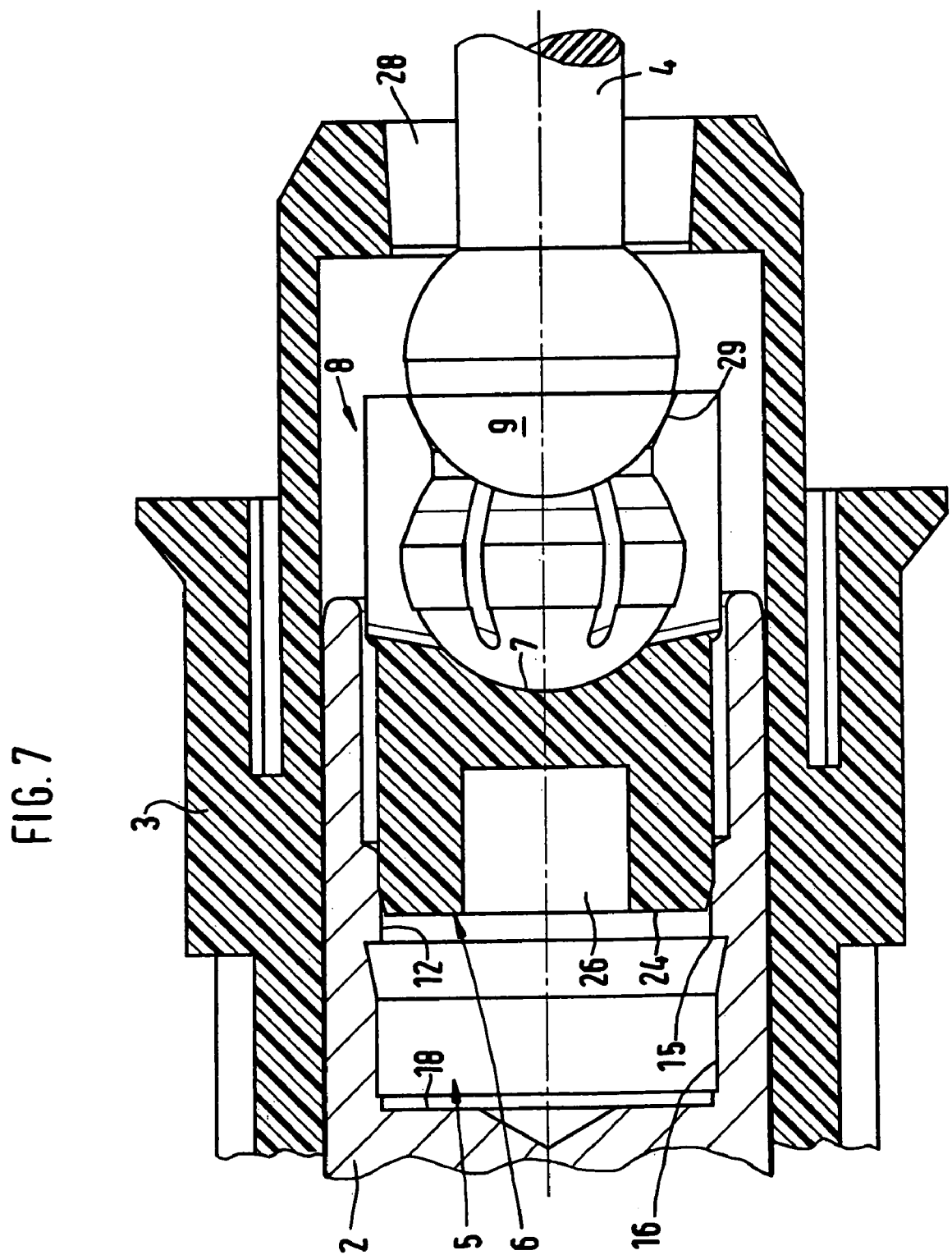
FIG. 7 shows a broken-open longitudinal section through the outer piston end and through the insert in a manner similar to FIG. 6, but with the guide sleeve pushed onto the piston and with the ball end of the ram brought up to the insertion sleeve of the insert.

The piston 2 with the insert 6 can now be pushed into the guide sleeve 3, as shown in FIG. 7. The ram 4 is introduced by its ball end 9 through an opening 28 in the end wall of the guide sleeve 3 until it reaches the insertion sleeve 8, wherein it strikes a peripheral chamfer 29 of the insertion sleeve 8, said peripheral chamfer 29 being shaped approximately like a truncated cone and allowing expansion of the insertion sleeve 8. As the insertion operation continues, the resilient tongues 23 now move laterally outwards, until they snap behind the ball end 9 as a result of the undercut in front of the ball seat 7, wherein the ball end 9 passes in a form-fitting manner into the ball seat 7. This position is shown in FIG. 8.

The axial pressure force to be exerted on the ram 4 in order to bring about the snap connection is smaller than the axial pressure force to be exerted on the ram 4 in order to slide over the first stop. The insert 6 therefore remains at the first travel-delimiting stop in the position shown in FIGS. 7 and 8 while the snap connection is produced, that is to say the peripheral chamfer 19 of the insert 6 is pressed against the transitional chamfer 13 between the second and third hole sections 11 and 12.

If the axial pressure force on the ram 4 is now increased, the insert 6 thus slides over the first stop with partial elastic and plastic deformation of the front end of its inner section 21, since the retaining force of the first stop is overcome. A second insertion travel of the insert 6 is thus started, said second insertion travel being delimited and therefore ended by the end face 24 striking the face 18 of the recess 5 which forms the second stop. This position of the parts can be seen from FIG. 9 and also FIG. 1. In practice, the insertion of the ram 4 by its ball end 9 is not carried out in two insertion movements which are separated from one another over time, but rather takes place in a single, coherent press-in operation.

Behind the sharp edge 15, the operation of pressing in and sliding over the first stop leads to a partial elastic back-deformation of the insert 6, so that the latter is held in the recess 5 in the position shown in FIGS. 1 and 9 even against very high pull-out forces introduced via the ram 4. Since the insertion sleeve 8 is also completely enclosed by the solid wall of the piston 2, very high pull-out forces moreover cannot pull the ball end 9 out of the ball seat 7 since the resilient tongues 23 cannot move out to the side.

There is thus proposed a piston arrangement for master and/or slave cylinders of a hydraulic actuating device for clutch and/or brake systems on motor vehicles, which piston arrangement is characterized by simplified manufacture and assembly of its components and also withstands high pull-out forces introduced via the ram. A suitable insert is inserted into a recess of the piston up to a first stop, said recess being designed as an elongate blind hole. The insert has a ball seat and an expandable insertion sleeve which is undercut with respect to the ball seat and initially protrudes outwards with its expandable region. The ram is pushed into the expandable insertion sleeve in the axial direction with its ball end which is shaped so as to be complementary to the ball seat, until the ball end snaps into the ball seat. As the ram continues to be pressed in the axial direction, the insert slides over the first stop, is firmly pressed into a narrow hole section of the recess and finally strikes a travel-delimiting second stop at the inner end of the recess. In this position, the insertion sleeve is tightly enclosed by the piston wall and can no longer expand even in the event of very high pull-out forces, that is to say cannot release the ball end of the ram.

We claim:
1. Piston arrangement for one of a master and slave cylinder of a hydraulic actuating device for one of a clutch and brake system on a motor vehicle, comprising
 a piston having an outer end with a recess,
 an insert suitable for fixing in the recess, said insert having a ball seat and an insertion sleeve which is undercut with respect to the ball seat, said insertion sleeve having slits and thus being expandable and, when it is fully inserted in the recess, being tightly enclosed by a piston wall which delimits the recess, and
 a ram which transmits actuating travels and forces, said ram having a ball end which is shaped so as to be complementary to the ball seat, which ball end can be coupled to the insert in order to mount the ram in an articulated manner via a snap connection brought about by the expandable insertion sleeve;
 wherein the insert is provided with a peripheral chamfer at its inner end, said peripheral chamfer being assigned, within the recess of the piston, a first stop for delimiting a first insertion travel of the insert in the recess, wherein, for bringing about the snap connection, the insert bearing against the first stop protrudes outwards with its expandable insertion sleeve substantially out of the recess of the piston, an axial pressure force that is to be exerted on the ram in order to bring about the snap connection being smaller than an axial pressure force that is to be exerted on the ram in order for the insert to slide over the first stop in the recess, and a second insertion travel of the insert which starts with the sliding-over being delimited by a second stop at the inner end of the recess.

2. Piston arrangement according to claim 1, wherein the piston has a central axis and wherein the recess is an elongate blind hole which is concentric with the central axis of the piston and has a number of cylindrical hole sections of different diameter.

3. Piston arrangement according to claim 2, wherein the elongate blind hole has essentially four cylindrical hole sections, of which the outer, first hole section has the largest diameter which is adapted to the external diameter of the insertion sleeve of the insert, said first hole section being followed by the second hole section of smaller diameter and then the third hole section having a diameter which is only slightly smaller than that of the second hole section, said third hole section having a transitional chamfer which forms the first stop, wherein the third hole section ends with a sharp edge produced by an annular groove, and wherein the annular groove is followed by the fourth hole section to which the annular groove adjoins with a conical transition face and which has a diameter that is larger than the diameters of the second and third hole sections.

4. Piston arrangement according to claim 3, wherein the recess ends, after the fourth hole section, at a face perpendicular to the central axis of the piston, which face forms the second stop for the insert.

5. Piston arrangement according to claim 3, wherein the insert has two essentially cylindrical sections of different diameter, of which the outer section has the larger diameter and forms the insertion sleeve, which is expandable by virtue of a number of axis-parallel slits in its wall, whereas the inner section has the smaller diameter which forms a press fit with the diameter of the third hole section of the recess of the piston.

6. Piston arrangement according to claim 5, wherein the inner section of the insert has in its circumferential surface a number of axis-parallel grooves which continue up to its end face.

7. Piston arrangement according to claim 5, wherein the insert has a concentric cut-out in the end face of its inner section.

8. Piston arrangement according to claim 1, wherein the insertion sleeve of the insert has a number of axis-parallel ribs distributed over its outer circumference.

9. Piston arrangement according to claim 1, wherein the ball end is shaped so as to be free of any ridges in its surface regions which transmit pressure forces and tensile forces.

10. Piston arrangement according to claim 1, wherein the piston is made of aluminum or an aluminum alloy, whereas the insert and the ram are molded from plastic.

* * * * *